United States Patent [19]
Cramer et al.

[11] Patent Number: 5,796,221
[45] Date of Patent: Aug. 18, 1998

[54] OVERLOAD DETECTOR FOR SERVO DRIVEN MACHINES

[75] Inventors: Charles C. Cramer, New Holstein; Dale M. Cherney, Howards Grove, both of Wis.

[73] Assignee: Paper Converting Machine Company, Green Bay, Wis.

[21] Appl. No.: 274,907

[22] Filed: Jul. 14, 1994

[51] Int. Cl.⁶ .................................................. H02P 5/46
[52] U.S. Cl. ........................ 318/68; 318/465; 318/46; 318/60; 361/51
[58] Field of Search ...................... 318/465, 461, 318/254, 445, 449, 450; 38/68, 51, 86, 45, 46, 47, 60, 61, 69; 361/23, 51

[56] References Cited

U.S. PATENT DOCUMENTS

| | | | |
|---|---|---|---|
| 3,791,037 | 2/1974 | DiCiaccio et al. | 33/655 |
| 4,518,899 | 5/1985 | Wolf | 318/68 |
| 4,878,333 | 11/1989 | Sommerfield | 53/67 |
| 5,130,748 | 7/1992 | Tanaka | 355/206 |
| 5,166,582 | 11/1992 | Jaeger et al. | 318/45 |
| 5,183,144 | 2/1993 | Francioni | 198/382 |
| 5,299,343 | 4/1994 | Tomoto et al. | 19/157 |
| 5,375,098 | 12/1994 | Malone et al. | 367/83 |

*Primary Examiner*—John W. Cabeca
*Attorney, Agent, or Firm*—Tilton, Fallon, Lungmus & Chestnut

[57] ABSTRACT

A controller for detecting abnormal operating conditions of a continuous motion machine such as a packaging machine. The acceleration and velocity of motors for the various axes of the machine are examined by the controller and rapid deceleration or a more gradual deceleration to a lower velocity relative to a machine velocity are employed for stopping the machine when overloads in the form of jams or mechanical faults occur in moving parts of the machine. By using this system, machine overloads can be detected much earlier than by using conventional techniques, and as a result, damage resulting from overloads and nuisance tripping can be eliminated or greatly reduced.

20 Claims, 6 Drawing Sheets

OVERLOAD DETECTOR FOR SERVO DRIVEN MACHINES

BACKGROUND OF THE INVENTION

This invention relates to protection of the moving parts of a servo driven apparatus such as packaging machinery, and more particularly to a controller for detecting an overload condition. The overload may be a mechanical problem or misplaced product which is jamming in the machine, and once detected, the machine is stopped prior to damage of the moving parts thereof.

Modern servo driven machines, such as packaging machines, typically are constructed with several different independently driven sections, each of the sections being driven by one or more servo motors. The operation and synchronization of the servo motors is coordinated by a machine controller which is connected to each of the servo motors. Each servo motor has its own motor controller (many times simply a servo amplifier) and a motion controller, connected to the machine controller, for controlling the motor. Typically, each of the independently driven sections of the packaging machine is termed an axis. Thus, the common packaging machine is composed of many axes.

In a packaging machine, one servo motor serves as the master axis for the machine, and the servo motors for the other axes follow the master axis through closed loop control techniques in the machine controller. Pre-set velocity ratios of the axes vis-a-vis the master axis are programmed in the machine controller, and during normal operation of the packaging machine, maintenance of velocity ratios within pre-set margins allows for normal operation and synchronization of the axes of the machine as products are being handled.

The control of the servo motors of a typical machine consists of an inner control loop in the motor controller and an outer control loop in the motion controller. The inner control loop usually incorporates an over current alarm which, when activated, operates to stop the operation of the servo motor and the mechanism it is driving. The outer control loop usually employs a position alarm which also is used to protect the servo motor and the mechanism it is driving. If the position of the motor in relation to the master axis falls outside of limits preset in the machine controller, the position alarm is activated to stop the motor. Typically, stopping of a motor also results in an overall shutdown of the entire packaging machine, since operation of the packaging machine is dependent upon proper operation of each of its axes.

A mechanical overload occurs when a product being conveyed through the packaging machine is out of place and jams in the machine or a mechanical problem places an unusually excessive load on one or more axes. In a product jam, the product begins to interfere with the normal mechanical motion of the machine, creating the jam. If the overload condition is not arrested, it can lead to damage of the mechanical parts of the packaging machine or damage of electrical parts due to overload and heat.

In a typical packaging machine, there may be one or more of three common mechanisms for detecting and arresting an overload condition. They are:

(1) a mechanical overload device between the servo motor and the mechanism being driven by the servo motor.

(2) detection of excessive current draw by a servo motor, typically known as an overcurrent condition.

(3) detecting of a positional error as determined by the motion controller calculated as the position difference between the master axis and a slave axis. This is typically known as a following error for a slave axis motor, and once detected, is used to stop the machine.

(4) as a correlary to (3), detection of a positional error in the master axis as determined by the motion controller calculated as the position difference between the commanded position of the axis and the actual position of the motor (also known as a following error) for the master axis motor in order to stop the machine.

In the typical packaging machine, there is not any rigid interconnection between the operating of the various axes. The machine controller is often called upon to make adjustments in order to maintain the correct velocity ratios of the machine, or to maintain synchronization of position of product handled by the machine or mechanical parts of the various axes. Thus, the common overload arresting mechanisms described above are often too slow to react or lack the sensitivity to provide adequate protection. For example, a mechanical overload device can be set too sensitively, causing a premature and unintended operation of the device and subsequent shut down of the entire packaging machine. If an overcurrent detector is used, it must be set high enough to allow for extra power output of a servo motor when corrections are being made during normal operation of the packaging machine. However, the difference between seeking extra power and a current overload may be quite small, and damage can easily occur. Finally, if position error is being used to detect an overload, because the axes of the packaging machine are not mechanically interlocked, there must be some allowance for positional changes in the machine and a range of correction allowed by the machine controller. Again, however, the difference between the range of correction and the occurrence of an overload may be so small as to result in machine damage before the occurrence of an overload can be detected and rectified.

Also, while the three common mechanisms for arresting an overload may provide adequate protection at low machine velocities, at higher velocities, the momentum of the mechanical parts of the machine can build to a level that despite these types of protection, machine components are damaged when an overload occurs. The problem associated with all three mechanisms is that they require a rather long period of time (generally in excess of 250 milliseconds) to detect an overload condition such that the failure level which is programmed in the system does not produce nuisance interruptions during normal acceleration, deceleration or running. It is therefore desirable to provide a system which can sense a mechanical overload early in the development of that condition and provide a signal to the motor controller to immediately stop the motor on the axis which is overloaded, and also provide a signal to the machine controller to provide a controlled shut-down of the entire packaging machine.

SUMMARY OF THE INVENTION

The invention is directed to a controller for detecting abnormal operating conditions of an axis of an apparatus having at least two axes. Each axis has a separate means for driving the axis, and one axis is designated as a master or machine axis and all other axes are designated as secondary or slave axes. The controller comprises means for generating a first signal indicative of a velocity of the master axis. Means is also provided for generating a second signal for each secondary axis, each such signal being indicative of a velocity of each secondary axis. Means is provided for periodically generating a ratio of each second signal to the first signal, and means is also provided for creating a ratio comparison by periodically comparing each generated ratio to a corresponding average ratio. If any one of the ratio comparisons exceeds a predetermined minimum deviation, means is provided for generating a stop signal. Responsive to that stop signal, means is provided for stopping the apparatus to avoid damage.

In accordance with the preferred form of the invention, the means for generating a first signal comprises a digital shaft encoder. Similarly, the means for generating a second signal comprises a digital shaft encoder for each of the secondary axes. Preferably, a microprocessor is employed for generating the ratios of the second signals with the first signal. The microprocessor includes means responsive to signals from the shaft encoders for creating the velocity representation for each axis. Also in accordance with the preferred form of the invention, the means responsive to signals from the shaft encoders comprises a resetable counter associated with each axis. The ratio of each second signal to the first signal therefore comprises a ratio of the value of the counter for each secondary axis to the value of the counter for the master axis.

Preferably the invention includes means for sampling and storing a predetermined number of the ratios for each axis, and for computing an average of the stored ratios. The average of the ratios is changed each time a new sample of the ratios is made. The apparatus includes means for comparing the last-determined ratio with a predetermined ratio, and for generating a stop signal if the last-determined ratio for an axis is less than the predetermined ratio by a preset amount.

The invention includes means to inhibit generation of a stop signal until the signals indicative of the velocity of the various axes exceed predetermined values. This is to prevent inadvertent generation of a stop signal during machine start up, jog or shut down conditions during normal operation.

Means is also provided to inhibit generation of a stop signal until the driving means for each axis is activated. Other wise, an improper stop signal could be generated during start up of the packaging machine when each axis is not up to its operational velocity, and during shut down, when axes may be deactivated sequentially rather than simultaneously.

Each of the driving means includes a motor controller, and the means for stopping the apparatus includes a signal generated by the motor controller. A machine controller is connected to each axis, and the means for stopping also includes a signal which can be provided by the machine controller to each axis.

The predetermined ratio of each second signal to the first signal is programmed in the controller. Means is provided for adjusting the predetermined ratio when desired.

In accordance with the preferred form of the invention, each of the driving means is a servo motor. However, other means of driving the axes can be employed.

In accordance with the process of the invention, a first signal indicative of a velocity of the master axis is generated. A second signal is generated for each of the secondary axes indicative of the velocity of each such axis. Periodically, a ratio of each second signal to the first signal is generated, and a ratio comparison is provided by comparing the last-determined ratio with an average ratio. Based upon that comparison, a stop signal is generated if any one of the comparisons exceeds a predetermined minimum deviation.

In accordance with preferred process of the invention, a step of sampling and storing a predetermined number of the ratios is provided for each axis, and the average ratio is computed from an average of the stored ratios. The average of the ratios is changed each time a new sample of the ratios is made.

The process also includes the step of comparing the last-determined ratio with a predetermined ratio, and a stop signal is generated if the last-determined ratio is different from the predetermined ratio by a preset amount. The predetermined ratio may be increased or decreased slightly especially during acceleration and deceleration caused by a response lag between the master and slave axes.

BRIEF DESCRIPTION OF THE INVENTION

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
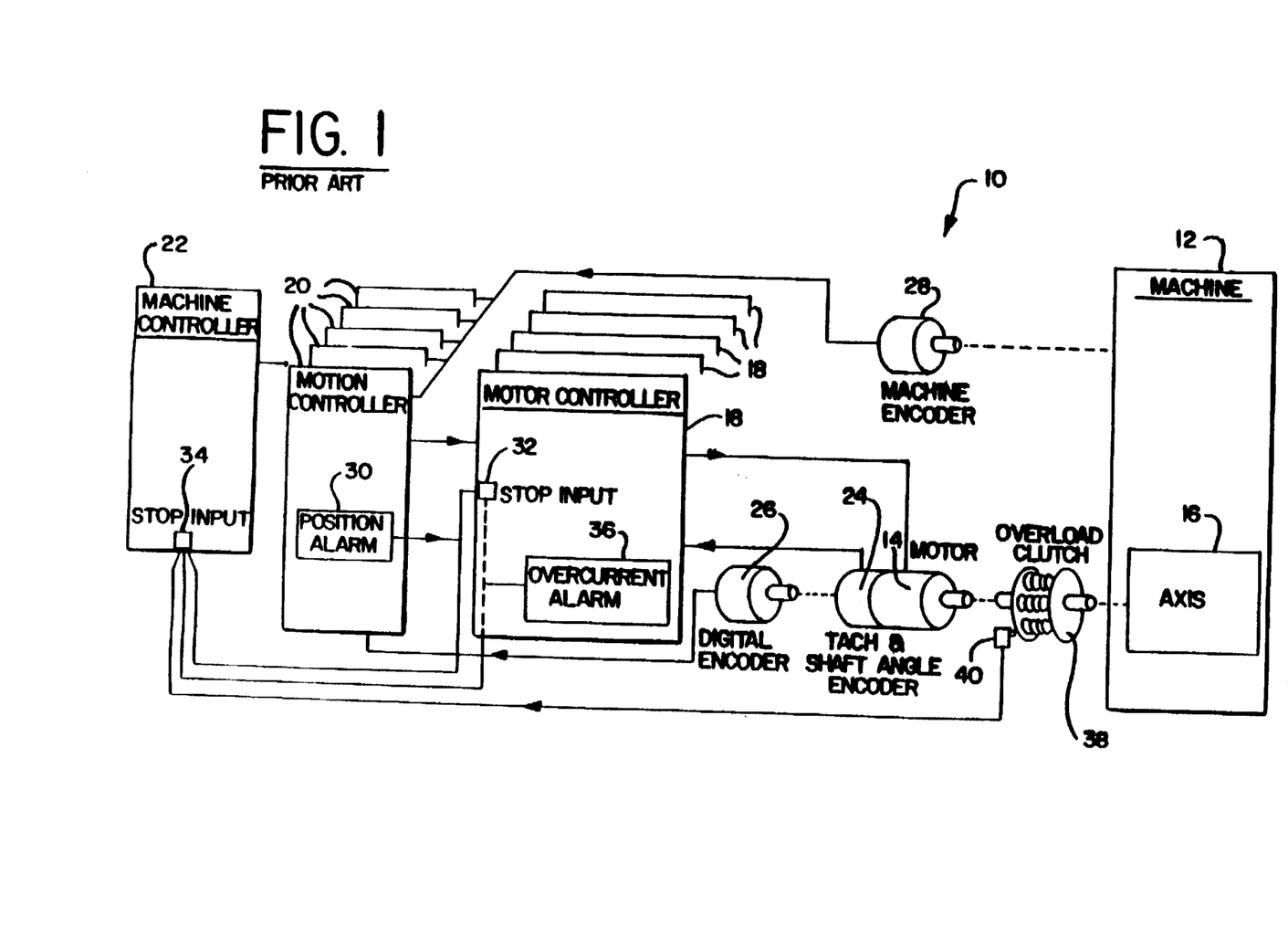
FIG. 1 is a schematic view of a typical machine control system of the prior art, including each of the three common mechanisms for arresting an overload.

A typical prior art apparatus and its control is shown generally at 10 in FIG. 1. It includes a machine 12. The machine 12 typically is composed of a series of sections or axes, each of which is operated separately by a separate servo motor. One example of such a machine is set forth in copending U.S. patent application Ser. No. 178,915, filed Jan. 7, 1994, now U.S. Pat. No. 5,447,012, the disclosure of which is incorporated herein by reference. The sections or axes of the machine 12 can be an input section, a conveying and lap sealing section, an end sealing section, and an outlet section. Each of the sections is an independent axis, and is driven independently by a series of conventional servo motors.

One such servo motor is depicted at 14 in FIG. 1. The servo motor is connected to drive one axis 16 of the machine, the axis being one of the sections such as those described above. There are multiple axes 16, each of which is driven by its own servo motor 14.

Each motor 14 is controlled by a motor controller 18. Each motor controller, in turn, is controlled by a motion controller 20. An overall machine controller 22 is connected to each of the motion controllers 20 for overall control of the machine 10.

The motor 14 includes a tachometer and shaft angle encoder 24. The encoder 24 is conventional, and is connected to the motor controller 18. A digital shaft encoder 26 is also employed, and generates a dual channel series of pulses which are used to determine both position and direction of rotation as the motor is operated. The digital shaft encoder 26 of each motor 14 is connected to its respective motion controller 20.

One of the axes of the apparatus 10 is selected as a machine or master axis, and the digital shaft encoder of that axis is designated as a master or machine encoder 28. The output of the master encoder 28 is connected to each of the motion controllers 20.

Each motion controller 20 is used to track the relative position of its motor 14 to the position of the master encoder 28. As is typical, a range of relative positions of the encoders 26 and 28 is predetermined and set in the motion controller 20, and if any position out of this range is detected, a position alarm 30 is activated as a result of the detected following error. The position alarm 30 is connected to a stop input 32 of its respective motor controller to stop each motor 14, and is also connected to a stop input 34 of the machine controller 22. The machine controller 22, when detecting a signal at the stop input 34, provides controlled shutdown of each of the axes of the machine 12.

The motor controller monitors the current drawn by the motor 14, and includes an overcurrent alarm 36. When the current drawn by the motor 14 exceeds a pre-set level for a pre-set period of time, the overcurrent alarm 36 is activated, sending a signal to the stop inputs 32 and 34 to immediately stop the motor 14 and cause a controlled shut down of the machine 12. In most systems, the overcurrent must be detected for a minimum period of time (typically 50 to 250 milliseconds) before the alarm is activated, and as a result, the response is relatively slow.

In the prior art apparatus 10, an overload clutch 38 or other similar mechanical device is also provided between each motor 14 and its axis 16. The clutch 38 responds to torque, and is mechanically set to release when torque becomes greater than that set. In a jam, the torque between the motor 14 and its axis 16 becomes excessively large, and the clutch 38 therefore releases. A limit switch 40 connected to the clutch 38 then signals the stop input 34 to produce a controlled shut down of the machine 12. Particularly in high speed applications, the clutch must be adjusted to very high torque levels to prevent normal acceleration, deceleration and running loads from releasing the clutch during normal operation.

In prior art machines, as explained above, the protection provided by the position alarm 30, the over current alarm 36 and the overload clutch 38 is not always effective since their sensitivity levels must be set sufficiently high to allow for normal operation of the apparatus 10 without falsely detecting a jam condition. However, by setting those sensitivity levels high, an overload can occur and by the time it is detected, it can be too late to prevent damage.

Figure 2:
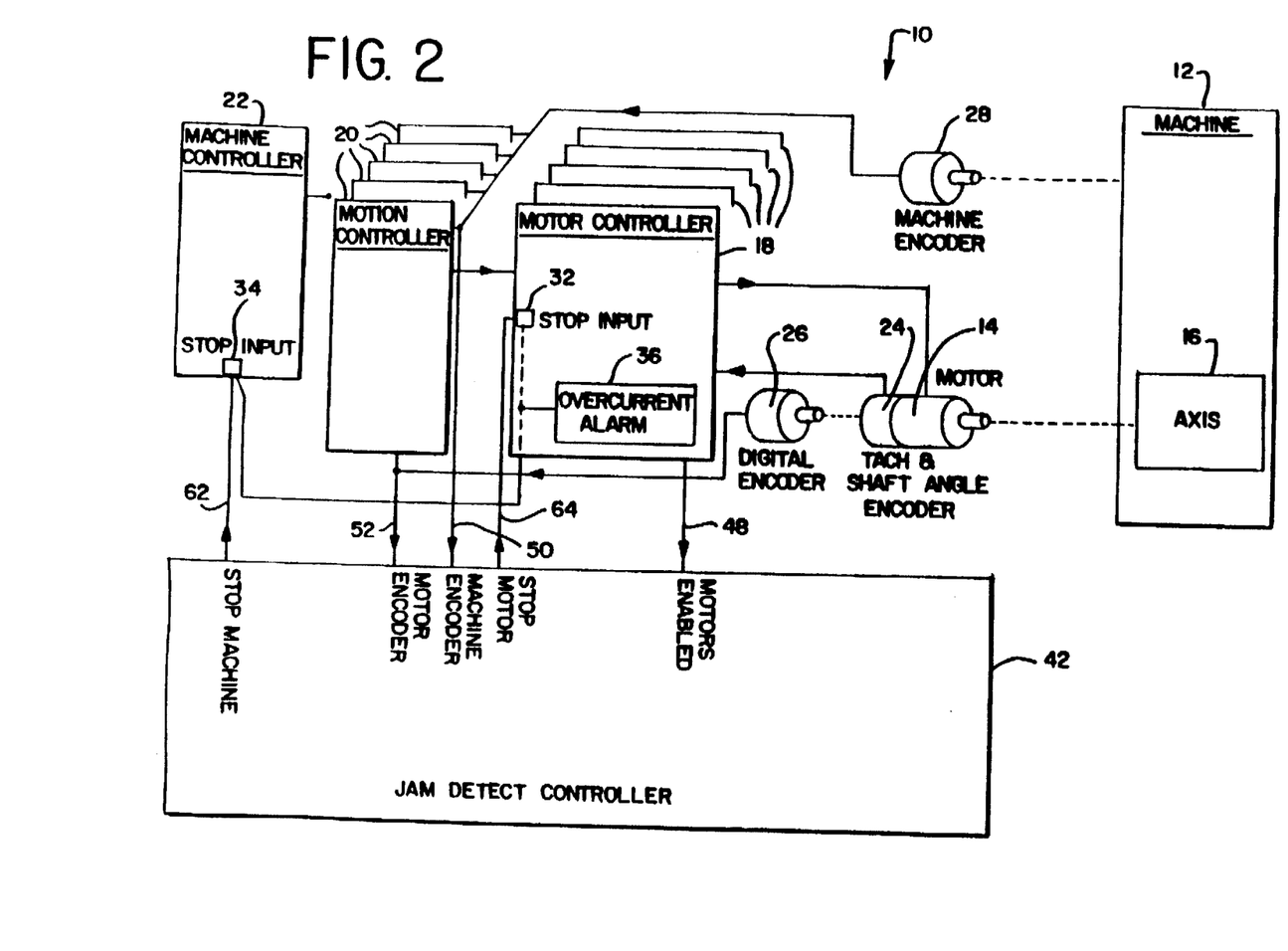
FIG. 2 is a schematic view of a typical machine employing the controller according to the invention.

FIG. 2 illustrates the overload detection and control according to the invention when employed in conjunction with the apparatus 10 illustrated in FIG. 1. Therefore, similar elements bear the same reference numerals as described above in relation to FIG. 1, and will not be described in greater detail. In this form of the invention, it is seen that the position alarm 30 and the overload clutch 38 are eliminated, although the overcurrent alarm 36 may be employed as a redundant safety feature, if desired.

In this form of the invention, an overload controller in the form of a jam detect controller 42 is employed for determining an overload condition. By "overload condition" it is meant an actual product jam, a mechanical failure in the machine, motor failure, or any other condition which causes one axis to be out of synchronism with normal operating conditions. The jam detect controller is shown in greater detail in FIG. 3, to which further attention is directed for the salient features of the jam detect controller 42 and its interrelationship with the apparatus 10.

Figure 3:
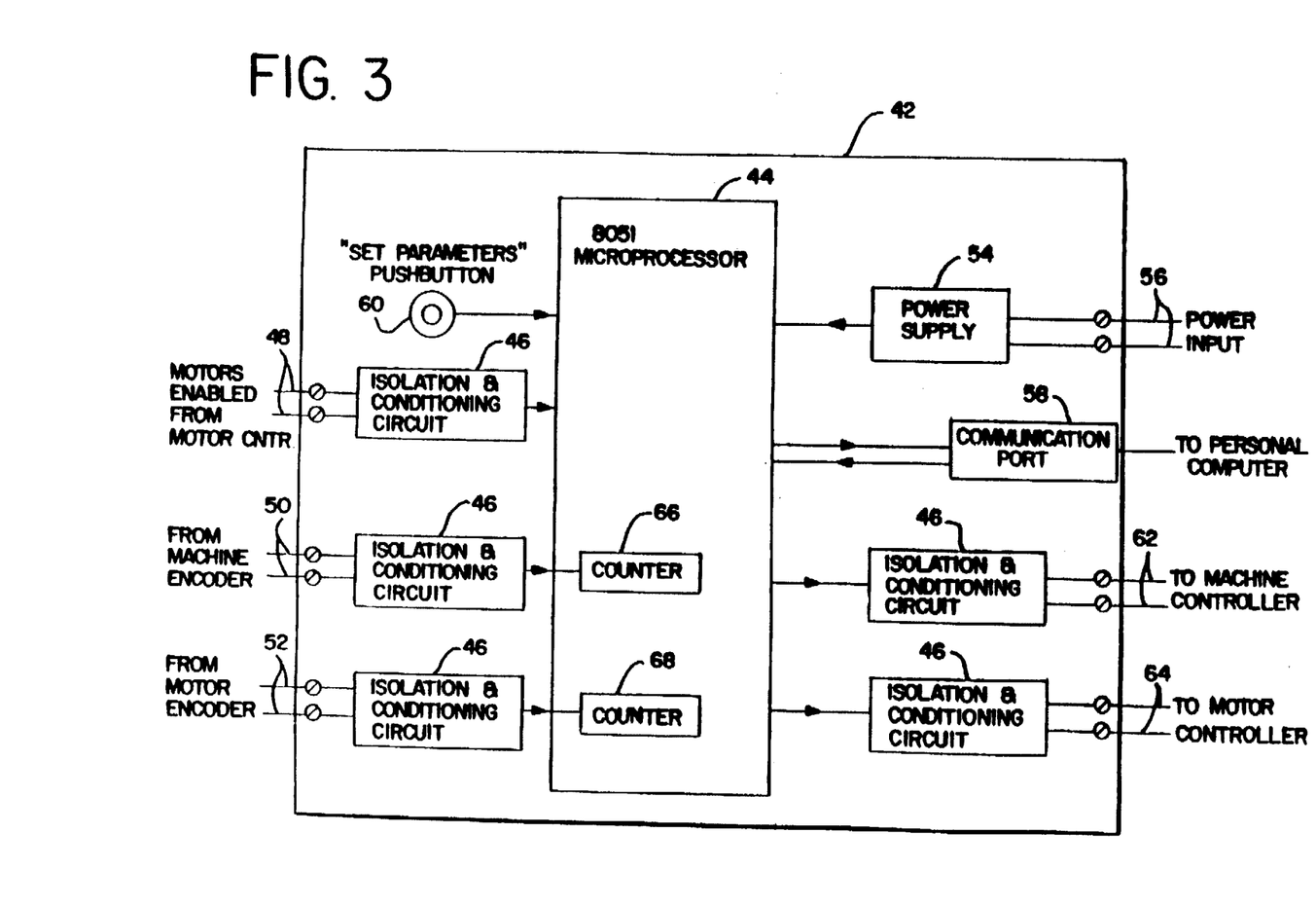
FIG. 3 is a block diagram of the controller according to the invention, illustrating greater detail.

The heart of the jam detect controller 42 is a microprocessor 44. The microprocessor 44 receives various inputs, performs various calculations, performs various functions, and stores information for use in the jam detection process. The microprocessor 44 may be an 8051 microprocessor, although other microprocessors can be employed, as well, so long as the various functions described below are performed by the microprocessor or by other apparatus under control of the microprocessor. Also, although a single microprocessor 44 has been illustrated, it will be evident that a series of microprocessors 44 can be employed depending on the duties demanded of the microprocessor 44 and the number of inputs thereto and outputs therefrom.

Each of the inputs from the apparatus 10 and outputs to the apparatus 10 is provided through an isolation and conditioning circuit 46 which provides, in a conventional fashion, filtering and isolation as an interface between the microprocessor 44 and the portion of the apparatus 10 to which it is connected. The means of isolation and conditioning may be conventional and is therefore not described in greater detail.

A first input to the microprocessor 44 is an input 48 from the motor controllers 18. That input indicates that each of the motors 14 of each of the axes 16 is activated. A second input 50 is provided from the master or machine encoder 28. A motor encoder input 52 is also provided from each of the digital encoders 26.

A power supply 54, which may be conventional, is connected to a source of power (not illustrated) by lines 56. The power supply 54 supplies necessary power for operation of the microprocessor 44. A communications port 58 is also provided, and can be connected to a computer (not illustrated) to interact with the microprocessor 44 for purposes described below. Finally, a push button 60 is employed for initiating the setting of preset parameters loaded in the microprocessor 44, such as those loaded by the computer.

The microprocessor 44 provides two outputs, an output 62 to the stop input 34 of the machine controller 22, and an output 64 to a respective one of the stop inputs 32 of a respective motor controller 18.

Input from the machine encoder 28 is applied via the input 50 to the microprocessor 44. The input is applied to a high speed counter 66, which is incremented for each pulse from the encoder 28. The counter therefore stores a representation of the machine velocity as provided by the machine encoder 28.

Each of the encoders 26 is connected to an input 52 to the microprocessor 44. Each input 52 is, in turn, connected to a high speed counter 68 which is incremented for each pulse from its respective encoder 26. Thus, each counter 68 also represents a velocity of the respective axis to which the encoder is connected.

Figure 4:
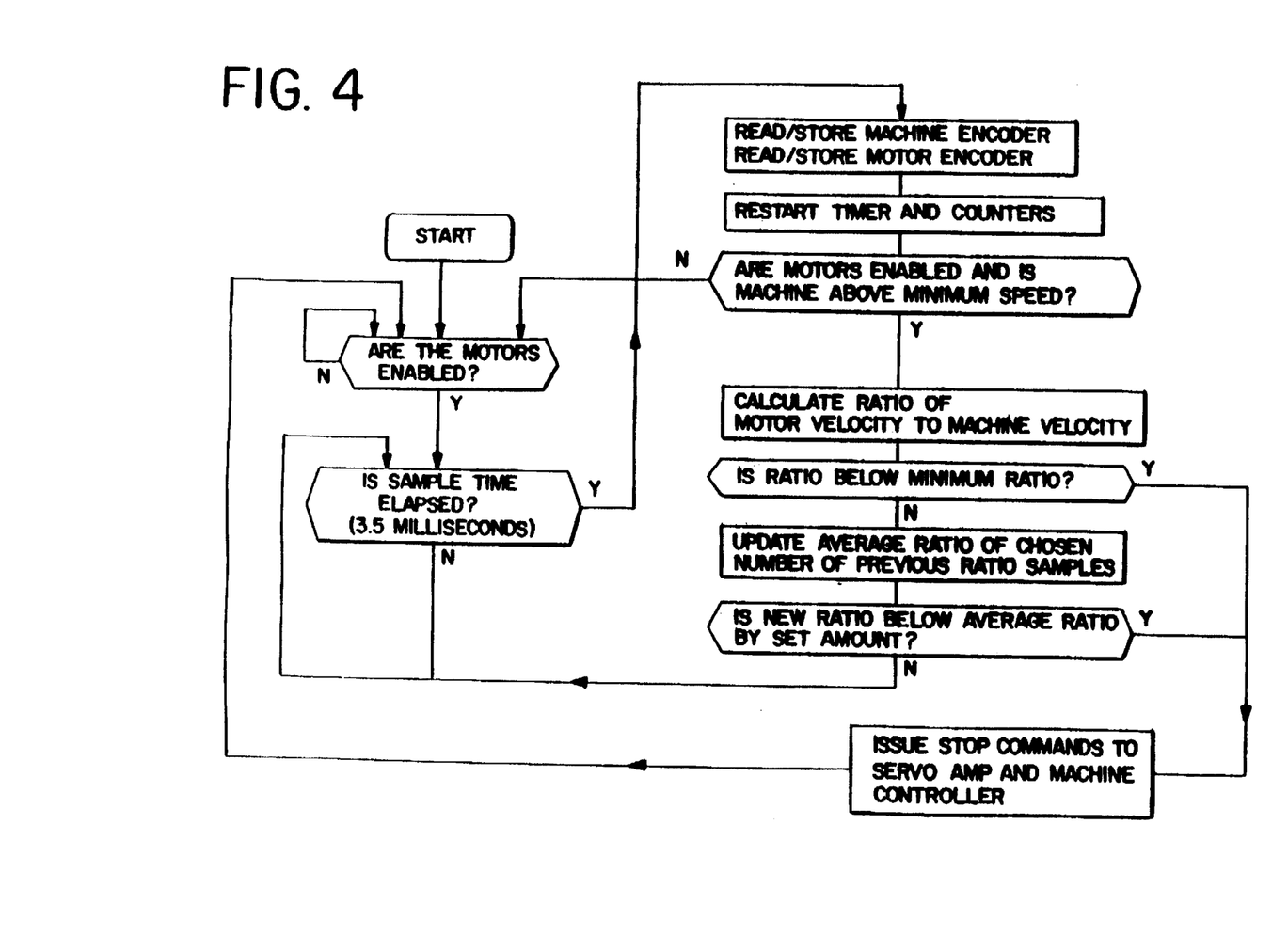
FIG. 4 is a flow chart of the logic employed by the invention for detection of an overload.

FIG. 4 is a flow chart depicting the logical sequence of events controlled by the microprocessor 44. When the apparatus 10 is initiated, and if the motors 14 have been enabled (and a signal provided on the lines 48), then the microprocessor 44 receives signals from the machine encoder 28 and the motion controllers 20 for the motors 14. A timer in the microprocessor 44 interrupts incrementing of the counters 66 and 68 at periodic intervals. A preferred interval is 3.5 milliseconds. Each time the timer interrupts the counters 66 and 68, the values of the counters 66 and 68 are stored, and the timer and the counters are re-started. The values of the counters yield the number of counts (therefore distance) per 3.5 milliseconds (therefore time), and are thus a measurement of the velocity of each of the motors 14.

Assuming that sufficiently high speeds are attained, the microprocessor 44 calculates the ratio of the motor velocity to the machine velocity for each axis. These last-determined ratios are compared to a calculated average ratio, and if any one of the ratio comparisons exceeds a predetermined minimum deviation from the applicable calculated average ratio, the motor 14 corresponding to the low ratio is immediately stopped (via a signal input to the stop input 32), and the stop input 34 of the machine controller 22 is activated to bring about a controlled stop of the entire apparatus 10.

If, however, the last-determined ratios are all above minimum deviations from the calculated average ratios, each last determined ratio is compared with a preset or predetermined ratio, and a difference is computed. If the difference is greater than a preset value for any one of the axes, then, again, the motor 14 of the particular axis is immediately halted via a signal on the output 64 to a stop input 32, and controlled shut down of the apparatus 10 is initiated via a signal on the line 62 to stop input 34 of the machine controller 22.

Thus, two controls are provided by the microprocessor 44 of the jam detect controller 42. First, when a slow jam occurs, the ratio of motor velocity to machine velocity decreases slowly below a preset minimum ratio, and shut down of the apparatus 10 occurs. Second, if a fast jam occurs, the average of a series of previous ratio samples is updated, and if the new ratio is below the average ratio by a set amount, shut down of the apparatus 10 also occurs.

Figure 5:
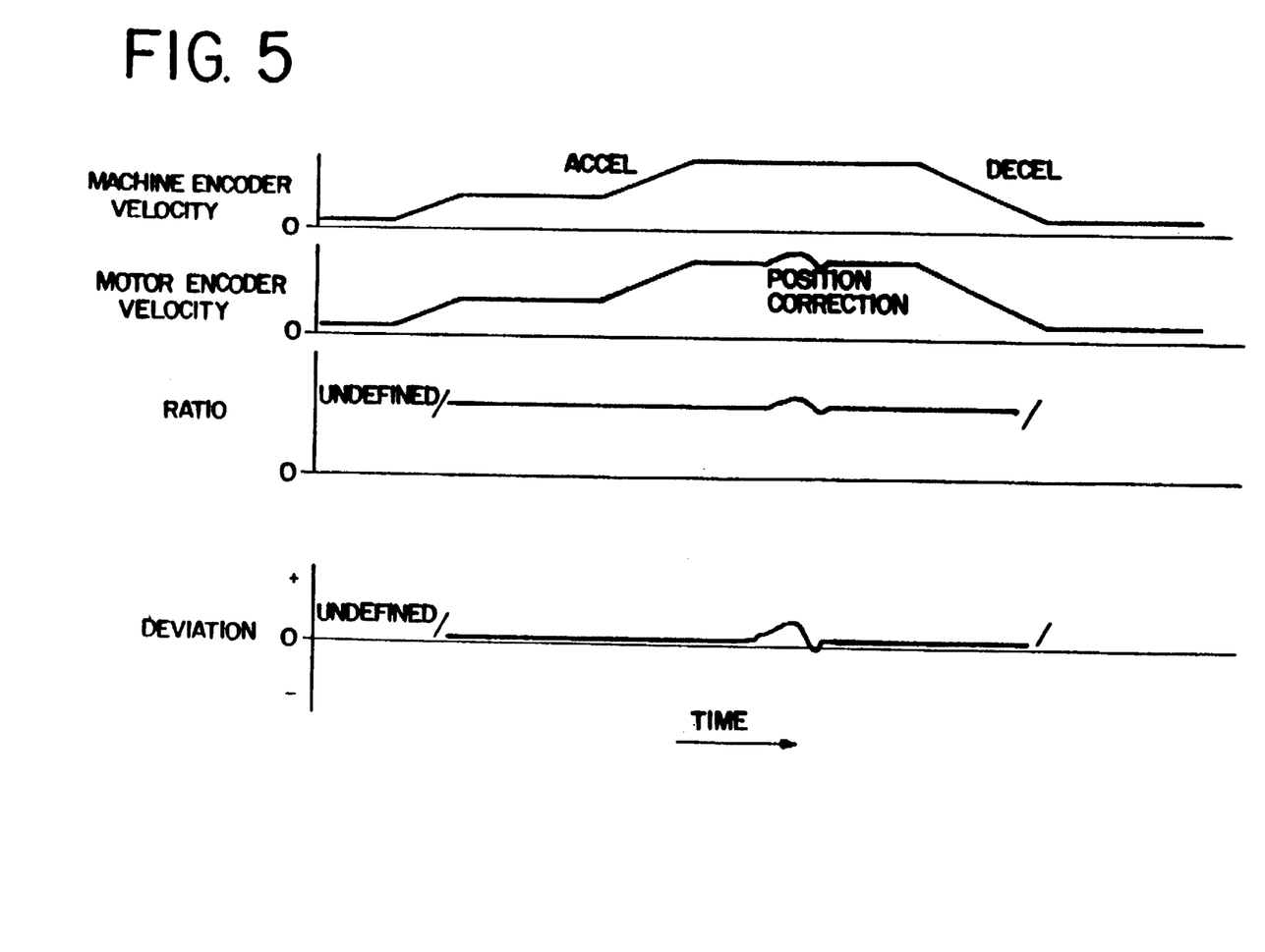
FIG. 5 is a graph depicting normal behavior of various machine elements and calculation in relation to time.

FIG. 5 illustrates the velocity of the machine encoder 28 in relation to time as well as the velocity of a motor encoder 26 in relation to time. As can be seen, whenever there is an acceleration of the machine, there is a similar acceleration of the particular motor 14, and therefore the ratio between the velocity of the machine encoder and the motor encoder remains constant under normal conditions. Therefore, there is no deviation from the standard ratio between these velocities under normal conditions, as the lower graphs illustrate.

FIG. 5 also shows a small disturbance which occurs when the machine controller 22 periodically adjusts the apparatus 10 during normal operation. That results in a small perturbation of the ratio, as well as a small perturbation in the deviation calculated, with neither being sufficient to cause shut down of the apparatus 10.

FIG. 5 also shows initially the start up of the machine, reflected in the start up of the machine encoder velocity and the start up of the motor encoder velocity. Prior to reaching a predetermined velocity, the ratio is not calculated, and therefore the deviation is not calculated, as well. When a minimum velocity is reached, however, calculations begin as described above.

Figure 6:
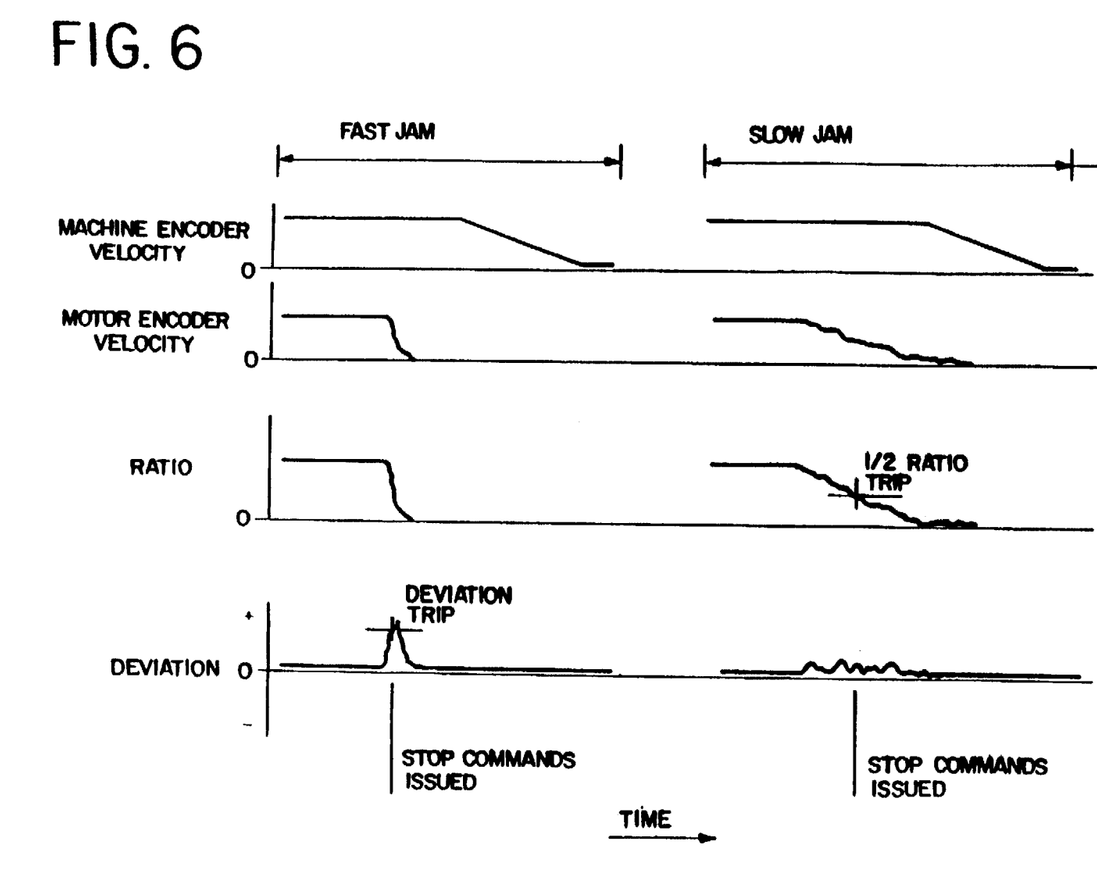
FIG. 6 depicts the same information as FIG. 5, but showing when an overload in the form of either a fast jam or a slow jam occurs in a machine.

FIG. 6 graphically shows how the motor velocity, the ratio of the motor velocity to machine velocity, and the deviation behave during a fast jam (left portion of FIG. 6) and a slow jam (right portion of FIG. 6). In the fast jam, the motor encoder velocity drops rapidly, and therefore the ratio decreases rapidly, as well. The deviation (difference between the average and last-determined ratios) therefore increases dramatically and quickly, and stop signals are generated by the microprocessor 44 to stop the jammed motor and also the entire apparatus 10. During the slow jam, however, the velocity of the motor decreases slowly, and therefore the average ratio decreases slowly, as well. During this time, the deviation does not increase dramatically, but after the last-determined ratio has decreased below a particular value, say one-half of a predetermined ratio, the microprocessor 44 initiates a shut down of the apparatus 10.

Thus, when a fast jam occurs, the deviation changes rapidly, and a shut down occurs, whereas during a slow jam, the deviation does not change rapidly, but the ratio decreases also resulting in a machine shut down. In either situation, stop commands are issued before damage occurs.

Starting parameters can be loaded in the microprocessor 44, and the push button 60 used to set those initial parameters during start up of the apparatus 10. The communication port 58 can be used, connected to a computer or other input device, for loading those parameters. In addition, the communication port 58 can be used to download information from the microprocessor 44 for other usages. This can allow analysis of stored data and ratios as well as maximum ratio shifts and response information for an axis under scrutiny.

The invention has been described generally above in relation to a machine which has two or more axes driven by synchronized motors, such as a modern packaging machine. It is employed to determine when one axis is out of synchronism with other axes, for whatever reason. The invention can also be employed with a single servo motor system, where a master signal is provided by an appropriate source, such as a computer-controlled counter, and the single servo is the slave. The invention could also be used where master and slave signals are provided by signals from two encoders connected to the same prime mover (not necessarily a servo). In the event that the slave/master ratio ever departed from a preset range, this would indicate a problem with the prime mover driving the two encoders. Also, while the description above relates generally to calculation of velocity ratios of slave to master, it should be evident that ratios of master to slave could be generated and used in the same manner as described above.

Various changes can be made to the invention without departing from the spirit thereof or scope of the following claims.

What is claimed is:

1. In an apparatus having at least two axes, each axis having a separate means for driving that axis, and one axis being designated as a master axis and all other axes being designated as secondary axes, the improvement comprising a controller for detecting abnormal operating conditions of an axis, comprising:

a. means for generating a first signal indicative of a velocity of the master axis,    b. means for generating a second signal for each secondary axis indicative of a velocity of each secondary axis,    c. means for periodically generating a ratio of each said second signal to said first signal, a most recently generated ratio being a last-determined ratio,    d. means during operation of said axes for creating an average ratio for each secondary axis from a series of said ratios for each secondary axis,    e. means for creating a ratio comparison by comparing each said last-determined ratio to a corresponding one of said average ratios,    f. means for generating a stop signal if any one of said ratio comparisons exceeds a predetermined minimum deviation from a corresponding average ratio, and    g. means responsive to said stop signal for stopping said apparatus.

2. An apparatus according to claim 1 in which said means for generating a first signal comprises a digital shaft encoder.

3. An apparatus according to claim 1 in which said means for generating a second signal comprises a digital shaft encoder for each secondary axis.

4. An apparatus according to claim 1 in which said means for generating a ratio comprises a microprocessor.

5. An apparatus according to claim 4 in which said means for generating a first signal and said means for generating said second signal comprise a digital shaft encoder for each axis, and said microprocessor includes means responsive to signals from said shaft encoders for creating a velocity representation for each axis.

6. An apparatus according to claim 5 in which said means responsive to signals comprises a counter associated with each axis.

7. An apparatus according to claim 6 in which said ratio of each said second signal to said first signal comprises a ratio of a value of the counter for each secondary axis to a value of the counter for said master axis.

8. An apparatus according to claim 1 including means for sampling and storing a predetermined number of said ratios for each axis, and for computing said average ratio from an average of said sampled and stored ratios.

9. An apparatus according to claim 8 including means for changing said average of said ratios each time a new sample of said ratios is made.

10. An apparatus according to claim 1 including means for comparing said last-determined ratio with a predetermined ratio and for generating said stop signal if the last-determined ratio is less than said predetermined ratio by a pre-set amount.

11. An apparatus according to claim 1 including means to inhibit generation of a stop signal until said signals indicative of a velocity exceed predetermined minimum signals.

12. An apparatus according to claim 1 including means to inhibit generation of a stop signal until each driving means for each axis is activated.

13. An apparatus according to claim 1 in which each driving means includes a motor controller, and in which said means for stopping includes a signal generated by said motor controller.

14. An apparatus according to claim 1 including a machine controller connected to each axis, and in which said means for stopping includes a signal to each axis generated by said machine controller.

15. An apparatus according to claim 1 including means for adjusting said predetermined ratio.

16. An apparatus according to claim 1 in which each said means for driving is a servo motor.

17. In an apparatus having a plurality of axes, each axis having a separate means for driving that axis and with one axis being a master axis and each other axis being a secondary axis, a process for detecting abnormal operating conditions of an axis, comprising:

a. generating a first signal indicative of a velocity of the master axis, b. generating a second signal for each secondary axis indicative of a velocity of each secondary axis, c. periodically generating a ratio of each said second signal to said first signal, a most recently generated ratio being a last-determined ratio, d. during operation of said axes creating an average ratio for each secondary axis from a series of ratios for said secondary axis, e. creating a ratio comparison by comparing each last-determined ratio with a corresponding one of said average ratios, and f. generating a stop signal if any one of said comparisons exceeds a predetermined minimum deviation from a corresponding average ratio.

18. A process according to claim 17 including the step of sampling and storing a predetermined number of said ratios for each axis, and computing said average ratio from an average of said sampled and stored ratios.

19. A process according to claim 18 including the step of changing the average of said ratios each time a new sample of said ratios is made.

20. A process according to claim 17 including the step of comparing the last-determined ratio for each axis with a predetermined ratio, and generating said stop signal if the last-determined ratio varies from said predetermined ratio by a pre-set amount.

* * * * *